United States Patent
Takeuchi et al.

(10) Patent No.: US 12,251,676 B2
(45) Date of Patent: Mar. 18, 2025

(54) JIG FOR INSERTING FILLING MEMBER INTO REACTOR

(71) Applicant: IHI CORPORATION, Tokyo (JP)

(72) Inventors: Yusuke Takeuchi, Tokyo (JP); Akihisa Yano, Tokyo (JP); Shunji Miyajima, Tokyo (JP); Shigeki Sakakura, Tokyo (JP); Taiga Yamamoto, Tokyo (JP); Takuya Yoshinoya, Tokyo (JP); Hiroyuki Kamata, Tokyo (JP); Daisuke Tsunoda, Tokyo (JP); Nobuyuki Honma, Tokyo (JP)

(73) Assignee: IHI Corporation, Tokyo (JP)

( * ) Notice: Subject to any disclaimer, the term of this patent is extended or adjusted under 35 U.S.C. 154(b) by 652 days.

(21) Appl. No.: 17/681,888

(22) Filed: Feb. 28, 2022

(65) Prior Publication Data

US 2022/0176339 A1   Jun. 9, 2022

Related U.S. Application Data

(63) Continuation of application No. PCT/JP2019/044504, filed on Nov. 13, 2019.

(51) Int. Cl.
  *B01J 19/32*   (2006.01)
  *B01J 35/56*   (2024.01)

(52) U.S. Cl.
  CPC .......... *B01J 19/325* (2013.01); *B01J 35/56* (2024.01)

(58) Field of Classification Search
  CPC ........ B01J 19/325; B01J 19/248; B01J 35/56; B01J 2219/2441; B01J 2219/2492; B01J 2219/2496; B01J 2219/2498; B01J 2219/328; F01N 3/28; C04B 2111/0081; Y02A 50/20; Y02T 10/12
  See application file for complete search history.

(56) References Cited

U.S. PATENT DOCUMENTS

| | | | | |
|---|---|---|---|---|
| 3,109,715 | A | * | 11/1963 | Johnson .............. F01N 13/0097 60/299 |
| 3,927,984 | A | | 12/1975 | Hartley |
| 5,015,446 | A | * | 5/1991 | Trujillo .................... B01J 8/008 422/637 |

(Continued)

FOREIGN PATENT DOCUMENTS

| CN | 104994950 A | 10/2015 |
|---|---|---|
| CN | 106317098 A | 1/2017 |

(Continued)

OTHER PUBLICATIONS

China National Intellectual Property Administration, "First Office Action", issued in Chinese Application No. 201980100389.8, which is a counterpart to U.S. Appl. No. 17/681,888, on Feb. 11, 2023, 7 pages.

(Continued)

*Primary Examiner* — Dapinder Singh (57) ABSTRACT

A jig for inserting a packing into a flow passage of a reactor extending in one direction or for removing the packing from the flow passage, includes: a pair of strip portions extending in parallel with each other, having a length longer than the flow passage; and link portions arranged in an extending direction of the pair of strip portions, linking the pair of strip portions and having lengths with which the pair of strip portions sandwich the packing therebetween.

15 Claims, 8 Drawing Sheets

(56) References Cited

U.S. PATENT DOCUMENTS

| | | | | |
|---|---|---|---|---|
| 6,730,274 | B1 * | 5/2004 | Ideguchi | F01N 3/2046 |
| | | | | 422/177 |
| 7,670,393 | B2 * | 3/2010 | Bowe | C01B 3/384 |
| | | | | 518/712 |
| 8,118,889 | B2 * | 2/2012 | Bowe | B01J 35/56 |
| | | | | 422/177 |
| 10,118,148 | B2 * | 11/2018 | Sakakura | F28D 9/0037 |
| 2016/0001256 | A1 | 1/2016 | Fujita et al. | |
| 2016/0101406 | A1 | 4/2016 | Hamada et al. | |
| 2018/0318786 | A1 | 11/2018 | Yano et al. | |
| 2018/0372415 | A1 | 12/2018 | Yoshinoya et al. | |
| 2019/0219344 | A1 * | 7/2019 | Yamamoto | F28D 9/0031 |
| 2019/0226765 | A1 * | 7/2019 | Xu | F28F 3/027 |
| 2019/0310026 | A1 * | 10/2019 | Chopard | F28F 3/046 |
| 2019/0310030 | A1 * | 10/2019 | Disori | F28F 3/06 |
| 2019/0366876 | A1 * | 12/2019 | Cheadle | F28D 1/035 |
| 2020/0030770 | A1 | 1/2020 | Yoshinoya | |
| 2020/0108474 | A1 * | 4/2020 | Thresher | B23P 15/26 |

FOREIGN PATENT DOCUMENTS

| | | |
|---|---|---|
| CN | 108472623 A | 8/2018 |
| EP | 3 015 166 A1 | 5/2016 |
| EP | 3 210 622 A2 | 8/2017 |
| JP | S50-085713 A | 7/1975 |
| JP | S63-099761 U | 6/1988 |
| JP | 2007-237044 A | 9/2007 |
| JP | 2015-157245 A | 9/2015 |
| JP | 2016-041079 A | 3/2016 |
| WO | 2013/001275 A2 | 1/2013 |
| WO | 2014/208444 A1 | 12/2014 |
| WO | 2017/138300 A1 | 8/2017 |
| WO | 2017/150653 A1 | 9/2017 |
| WO | 2018/181434 A1 | 10/2018 |

OTHER PUBLICATIONS

European Patent Office, "Extended European Search Report", issued in European Patent Application No. 19 952 553.6, which is a counterpart to U.S. Appl. No. 17/681,888, on Jun. 21, 2023, 7 pages.

* cited by examiner

JIG FOR INSERTING FILLING MEMBER INTO REACTOR

CROSS REFERENCE TO RELATED APPLICATIONS

This application is a continuation application of International Application No. PCT/JP2019/044504, now WO2021/095157, filed on Nov. 13, 2019, the entire contents of which are incorporated by reference herein.

BACKGROUND

1. Technical Field

The present disclosure relates to a jig for inserting or removing a packing such as a catalyst body installed in a flow passage of a reactor.

2. Description of the Related Art

Heat exchange type reactors heat or cool a reaction fluid containing a reaction raw material by heat medium to promote the reaction of the reaction fluid. Such a reactor includes, for example, a heat exchange section having reaction flow passages for flowing a reaction fluid and heat medium passages for flowing a heat medium. A catalyst body may be provided in the reaction flow passage to promote the reaction. Methods of installing the catalyst body include: methods of directly providing such as filling powder or pellets into the reaction flow passage, or supporting the catalyst on wall surfaces; and a method of inserting structured catalysts into the reaction flow passage.

When a cross-sectional area of the reaction flow passage is reduced while the volume of the reaction field is kept constant, the contact area (specific surface area) between the reaction fluid and the catalyst per unit volume is improved. In this case, accordingly, the heat transfer efficiency can be increased, and the reaction rate and yield can be improved. JP 2007-237044 A discloses a reactor which is intended to simplify the replacement operation of a catalyst body in a flow channel while reducing the cross section of the flow channel.

SUMMARY

In a reactor in which a catalyst body is installed in a reaction flow passage, the catalyst body is likely to be firmly sticked on the inner surface of the reaction flow passage by a long time operation. In particular, when the catalytic reaction proceeds at a high temperature or is accompanied by heat generation, the adhesion of the catalyst body is promoted by interdiffusion of materials of the reaction flow passage and the catalyst. When the catalyst body is firmly sticked to the reaction flow passage, removal of the catalyst body becomes difficult. In particular, in a reactor called a compact reactor or a microreactor, the contact area of the inner surface of the reaction flow passage with respect to the size of the catalyst body is relatively large because the cross-sectional area of the reaction flow passage is in the range of several to several tens of $mm^2$. Therefore, in such a reactor, it becomes more difficult to remove the fixed catalyst body. Further, in such an apparatus, the number of reaction flow passages reaches from several hundred to several thousand, so that it is necessary to smoothly insert the catalyst into the reaction flow passages.

It is therefore an object of the present disclosure to provide a jig that facilitates insertion and removal of a packing such as a catalyst body disposed in a flow passage of a reactor.

One aspect of the present disclosure is a jig for inserting a packing into a flow passage of a reactor extending in one direction or for removing the packing from the flow passage. The jig includes: a pair of strip portions extending in parallel with each other, having a length longer than the flow passage; and link portions arranged in an extending direction of the pair of strip portions, linking the pair of strip portions and having lengths with which the pair of strip portions sandwich the packing between the pair of strip portions.

Each of the strip portions may include: a tip end portion provided as one end in the extending direction; and a base end portion provided as the other end in the extending direction. The tip end portion of one of the pair of strip portions may be inclined to approach the strip portion of the other of the pair of strip portions. The link portions may include: first link portions positioned on a side with the tip end portion and provided at intervals longer than the packing in the extending direction of the pair of strip portions; and at least one second link portion positioned closer to the base end portion than the first link portions. Each of the first link portions may be connected to a center of each strip portion in a width direction thereof. Each second link portion may be connected to a position shifted from a center of each strip portion in a width direction thereof. At least one of the at least one second link portion may be located at a part of the pair of strip portions, the part being exposed from the flow passage. The flow passage may be a reaction flow passage through which a reaction fluid flows, and the packing may be a catalyst body.

According to the present disclosure, it is possible to provide a jig which facilitates insertion and removal of a packing such as a catalyst body installed in a flow passage of a reactor.

DESCRIPTION OF THE EMBODIMENTS

Embodiments of the present disclosure will be described below with reference to the drawings. Note that the same reference numerals are given to the common parts in each of the figures, and duplicated explanations are omitted.

Figure 1:
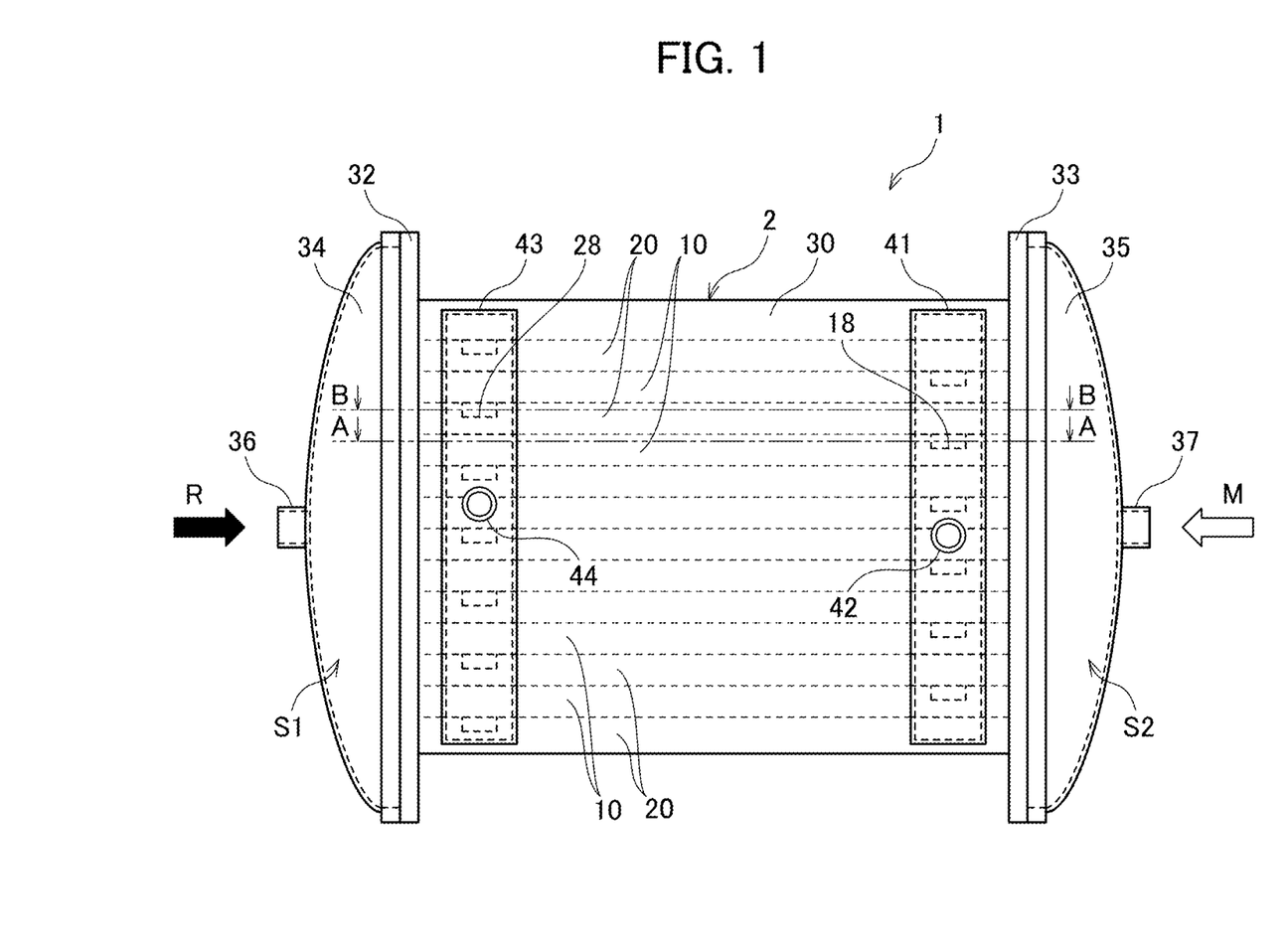
FIG. 1 is a side view showing a reactor according to an embodiment.
Figure 2:
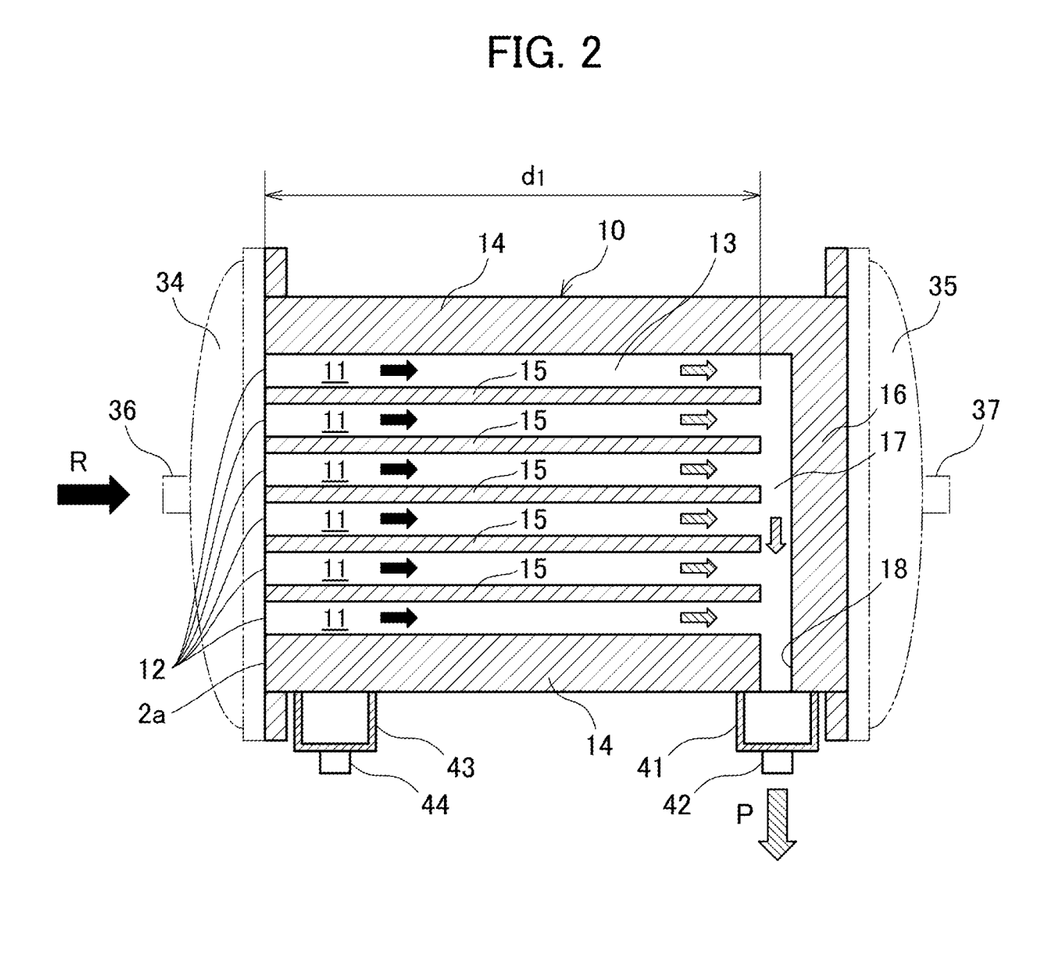
FIG. 2 is a cross-sectional view taken along line A-A of FIG. 1.
Figure 3:
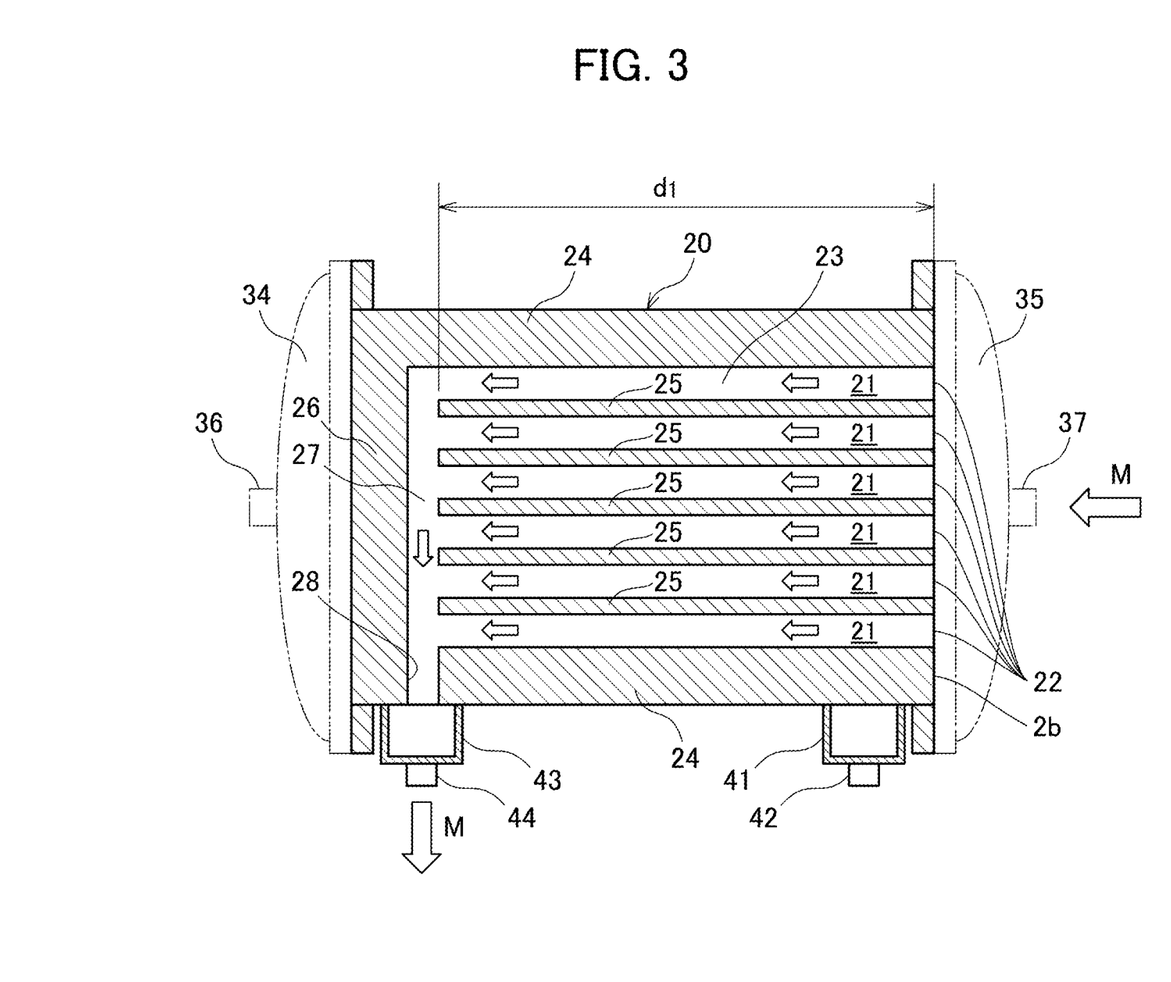
FIG. 3 is a cross-sectional view taken along line B-B of FIG. 1.
Figure 4:
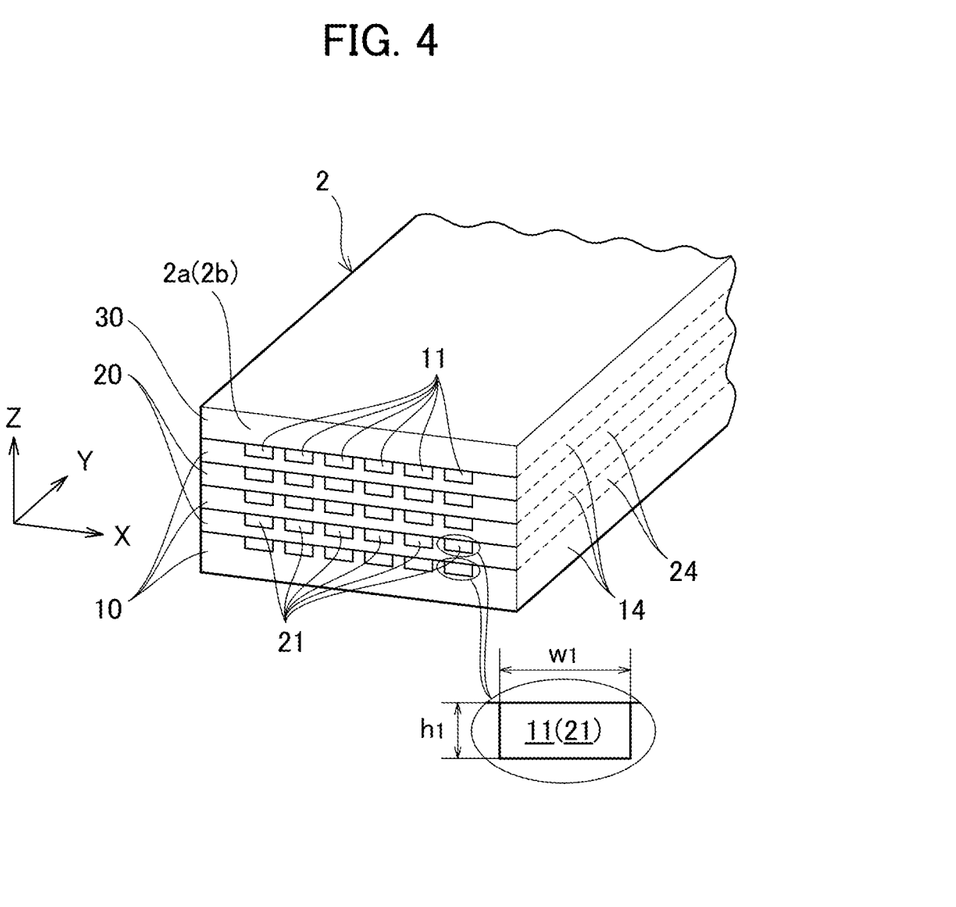
FIG. 4 is a three-dimensional cross-sectional view showing a part of a heat exchange section according to an embodiment.

FIG. 1 is a side view showing a reactor (catalytic reactor) according to the present embodiment. FIG. 2 is a cross-sectional view taken along line A-A in FIG. 1. FIG. 3 is a cross-sectional view taken along line B-B in FIG. 1. FIG. 4 is a three-dimensional cross-sectional view showing a part of the heat exchange section 2 according to the present embodiment.

The reactor 1 heats or cools the reaction fluid by heat exchange between the reaction fluid containing the reaction raw material and the heat medium to promote the reaction of the reaction fluid. The reactor 1 includes a heat exchange section 2. The heat exchange section 2 includes a first heat conductor 10, a second heat conductor 20, and a lid plate 30. The first heat conductor 10, the second heat conductor 20, and the lid plate 30 are flat plate-like members formed of a heat-resistant and heat-conductive material, and have sufficient thicknesses to withstand a high internal pressure generated during when the reaction fluid R flows.

The first heat conductor 10 has a flow passage (hereinafter referred to as the first flow passage) 11 through which a reaction fluid flows. On the other hand, the second heat conductor 20 has a flow passage (hereinafter referred to as the second flow passage) 21 through which the heat medium flows. The first heat conductor 10 and the second heat conductor 20 are alternately stacked, and the lid plate 30 is installed on the uppermost one of them.

With the above-described stacking, the first flow passage 11 and the second flow passage 21 are adjacent to each other via the first partition wall 13 or the second partition wall 23 (see FIG. 4). In other words, the first flow passage 11 and the second flow passage 21 are adjacent to each other in a non-contact state in the stacking direction of the first heat conductor 10 and the second heat conductor 20.

The heat exchange section 2 has a counterflow type structure in which a reaction fluid and a heat medium flow in opposite directions. A catalyst body 50 (see FIG. 5) as a packing is detachably installed in the first flow passage 11. Similarly, a heat transfer enhancer (enhancement body) 55 (see FIG. 6) as a packing is detachably installed in the second flow passage 21. Further, a jig 60 (see FIGS. 7A and 7B) for the reactor 1 is used for the installation and removal of these. The heat transfer enhancer 55 may not need to be installed depending on the specifications of the reactor 1.

The heat exchange section 2 is constituted of at least one set of a first heat conductor 10 and a second heat conductor 20. The number of each heat conductor may be increased to improve the heat exchange performance. The number of flow passages formed in each heat conductor is set in consideration of the design conditions and heat transfer efficiency of the heat exchange section 2. Further, in order to suppress heat loss due to heat radiation from the heat exchange section 2, a housing or a heat insulating material may cover the periphery of the heat exchange section 2.

Both ends of the heat exchange section 2 as a stacked body are held by fixing members 32 and 33. A reaction fluid introduction section 34 is attached to the fixing member 32. The reaction fluid introduction section 34 is a recessed curved lid body and forms a space S1 between the reaction fluid introduction section 34 and the heat exchange section 2. First inlet ports 12 of the first flow passages 11 are opened to the space S1 (see FIG. 2). In other words, the first inlet ports 12 are opened on the side surface (end surface) 2a of the heat exchange section 2 facing the reaction fluid introduction section 34. The reaction fluid introduction section 34 has a first introduction pipe 36 for introducing the reaction fluid R. The reaction fluid R flows into each of the first flow passages 11 through the first introduction pipe 36.

The reaction fluid introduction section 34 is detachably or openably installed on the fixing member 32. With these attachment and detachment, for example, the operator can insert the catalyst body 50 into the first flow passage 11 or remove it from the first flow passage 11.

The product discharge section 41 is a box-shaped member having one open surface. The product discharge section 41 is installed in the heat exchange section 2 so that the open surface is fitted to the first outlet port 18 of the first heat conductor 10. The product discharge section 41 has a first discharge pipe 42. The first discharge pipe 42 discharges a reaction gas P containing a product derived from the reaction fluid R.

A heat medium introduction section 35 is attached to the fixing member 33. Similar to the reaction fluid introduction section 34, the heat medium introduction section 35 is a recessed curved lid body and forms a space S2 between the heat medium introduction section 35 and the heat exchange section 2. Second inlet ports 22 of the second flow passages 21 are opened into the space S2. In other words, the second inlet ports 22 are opened on the side surface (end surface) 2b of the heat exchange section 2 facing the heat medium introduction section 35. The heat medium introduction section 35 has a second introduction pipe 37 for introducing the heat medium M. The heat medium M flows into each second flow passage 21 through the second introduction pipe 37.

The heat medium introduction section 35 is detachably or openably installed on the fixing member 33. With these attachment and detachment, for example, the operator can insert the heat transfer enhancer 55 into the second flow passage 21 or remove it from the second flow passage 21.

The heat medium discharge section 43 is a box-shaped member having one open surface, similar to the product discharge section 41. The heat medium discharge section 43 is installed in the heat exchange section 2 so that the open surface is fitted to the second outlet port 28 of the second heat conductor 20. The heat medium discharge section 43 has a second discharge pipe 44. The second discharge pipe 44 discharges the heat medium M flowing through the heat exchange section 2.

As shown in FIG. 2, the first heat conductor 10 has first flow passages 11 including reaction regions. The intermediate portion of the first flow passage 11 is a main reaction region. The first flow passage 11 receives the heat of the heat medium flowing through the second flow passage 21 in the second heat conductor 20 described later and reacts the reaction fluid R to generate a reaction gas P containing a product derived from the reaction fluid R.

The first flow passage 11 is a groove formed in one surface (upper surface in the present embodiment) of the first heat conductor 10. The groove has a rectangular cross section having a width w1 and a height h1 (see FIG. 4), and extends in one direction with a length d1 (see FIG. 2). The first flow passage 11 extends linearly toward the fixing member 33 from the first inlet port 12 located on the fixing member 32 side. As shown in FIG. 2, the first flow passages 11 are arranged in parallel.

The first heat conductor 10 includes a first partition wall 13, two first side walls 14, first intermediate walls 15, and a first end wall 16. The first side wall 14, the first intermediate wall 15 and the first end wall 16 are provided on one surface of the first partition wall 13. The first partition wall 13 is a rectangular wall portion and defines the overall shape of the first heat conductor 10. The first side walls 14 are wall portions provided on both sides of the extending direction of the first flow passages 11. The first intermediate walls 15 are wall parts positioned between the two first side walls 14 and provided in parallel with each of the first side walls 14.

The first end wall 16 is a wall provided on the side opposite to the first inlet port 12 across the first flow passages 11, and extending in the arrangement direction of the first flow passages 11. The first end wall 16 prevents the reaction gas P from flowing into the space S2.

The first heat conductor 10 has a first communication flow passage 17 extending along the first end wall 16. The first communication flow passage 17 communicates with all the first flow passages 11 and communicates with the first outlet port 18. Similar to the first flow passages 11, the first communication flow passage 17 is a flow passage through which the reaction fluid R and the reaction gas P flow, and there is no substantial difference between them.

As shown in FIG. 3, the second heat conductor 20 has second flow passages 21. The second flow passages 21 supply the heat of the heat medium M to the first heat conductor 10.

The second flow passage 21 is a groove formed in one surface (upper surface in the present embodiment) of the second heat conductor 20. The groove has a rectangular cross section having a width w1 and a height h1 (see FIG. 4), and extends in one direction with a length d1 (see FIG. 3). The second flow passage 21 extends linearly toward the fixing member 32 from the second inlet port 22 located on the fixing member 33 side. As shown in FIG. 3, the second flow passages 21 are arranged in parallel. The width, height and length of the first flow passage 11 and the second flow passage 21 may be different.

The second heat conductor 20 includes a second partition wall 23, two second side walls 24, second intermediate walls 25, and a second end wall 26. The second side wall 24, the second intermediate walls 25 and the second end wall 26 are provided on one surface of the second partition wall 23. That is, they are provided on the same surface side as the surface on which the first side wall 14 and the like are provided with respect to the first partition wall 13. The second partition wall 23 is a rectangular wall that defines the overall shape of the second heat conductor 20. The second side wall 24 is a wall portion provided on both sides of the extending direction of the second flow passages 21. The second intermediate walls 25 are wall parts positioned between the two second side walls 24 and provided in parallel with the respective second side walls 24.

The second end wall 26 is provided on the side opposite to the second inlet port 22 across the second flow passages 21, and is a wall portion extending in the arrangement direction of the second flow passages 21. The second end wall 26 prevents the heat medium M from flowing into the space S1.

The second heat conductor 20 has a second communication flow passage 27 extending along the second end wall 26. The second communication flow passage 27 communicates with all the second flow passages 21 and communicates with the second outlet port 28.

The heat exchanger 2 can be used as a liquid-to-liquid heat exchanger, a gas-to-air heat exchanger, or a gas-to-liquid heat exchanger. The reaction fluid and the heat medium may be either a gas or a liquid. The reactor 1 according to the present embodiment can perform chemical synthesis by various thermal reactions such as endothermic reaction, exothermic reaction or other reactions. Such thermal reactions are, for example, steam reforming reactions of methane represented by formula (1), endothermic reactions such as dry reforming reactions of methane represented by formula (2), shift reactions represented by formula (3), methanation reactions represented by formula (4), and exothermic reactions such as Fischer-Tropsch synthesis represented by formula (5). Here, the reaction fluid in these reactions is a gas.

$$CH_4 + H_2O \rightarrow 3H_2 + CO \qquad (1)$$

$$CH_4 + CO_2 \rightarrow 2H_2 + 2CO \qquad (2)$$

$$CO + H_2O \rightarrow CO_2 + H_2 \qquad (3)$$

$$CO + 3H_2 \rightarrow CH_4 + H_2O \qquad (4)$$

$$(2n+1)H_2 + nCO \rightarrow C_nH_{2n+2} + nH_2O \qquad (5)$$

The heat medium is preferably a material which does not corrode the constituent materials of the reactor 1. When heating gas is used as the heat medium, gaseous substances such as combustion gas, heating air or the like, can be used. The heat medium may be, for example, a liquid substance such as water, oil or the like.

Figure 5:
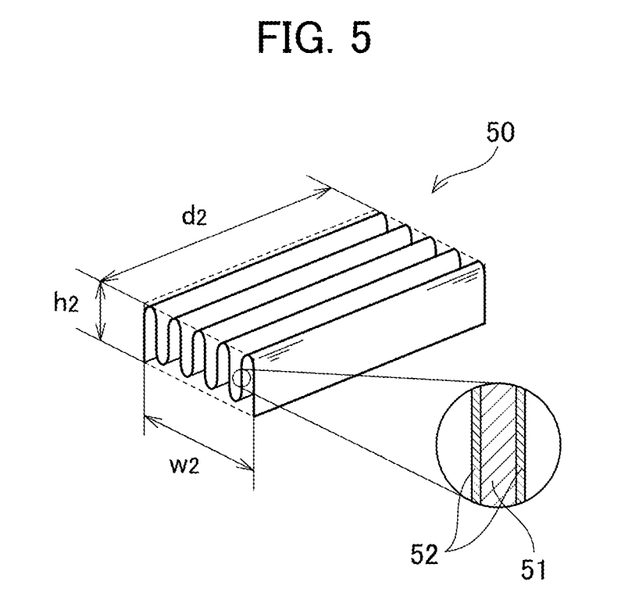
FIG. 5 is a perspective view showing an example of a catalyst body according to an embodiment.

FIG. 5 is a perspective view showing an example of the catalyst body 50 according to the present embodiment. The catalyst body 50 is installed in the first flow passage 11 to promote the reaction in the reaction fluid. As shown in FIG. 5, the catalyst body 50 has a base material 51 defining an overall shape and a catalyst layer 52 formed on (supported with) the surface of the base material 51. The base material 51 has a box-shaped outer shape of height h2, width w2, and depth d2 to be installed in the first flow passage 11. The base material 51 has a shape ensuring a large contact area with the reaction fluid. Therefore, the base material 51 is constituted of a corrugated plate forming the box-shaped outer shape, for example, as shown in FIG. 5. Note that the base material 51 is not limited to the corrugated plate, and may be a structure such as a porous body having a large number of through-passages formed along the reaction flow passage.

The catalyst layer 52 contains an active metal as a main component, which is effective for promoting the progress of a chemical reaction. Examples of the active metal include Ni (nickel), Co (cobalt), Fe (iron), Pt (platinum), Ru (ruthenium), Rh (rhodium), Pd (palladium), and the like. One kind of them may be used. Otherwise, plural kinds of them may be used in combination as long as they are effective for promoting the reaction.

The base material 51 is formed of a material having heat resistance and capable of supporting a catalyst. Examples of such materials include heat-resistant alloys mainly composed of one or more kinds of metals such as Fe (iron), Cr (chromium), Al (aluminum), Y (yttrium), Co (cobalt), Ni (nickel), Mg (magnesium), Ti (titanium), Mo (molybdenum), W (tungsten), Nb (niobium) and Ta (tantalum). For example, the catalyst body 50 may be formed by molding a thin plate-like structural material made of a heat-resistant alloy such as Fecralloy (registered trademark).

Figure 6:
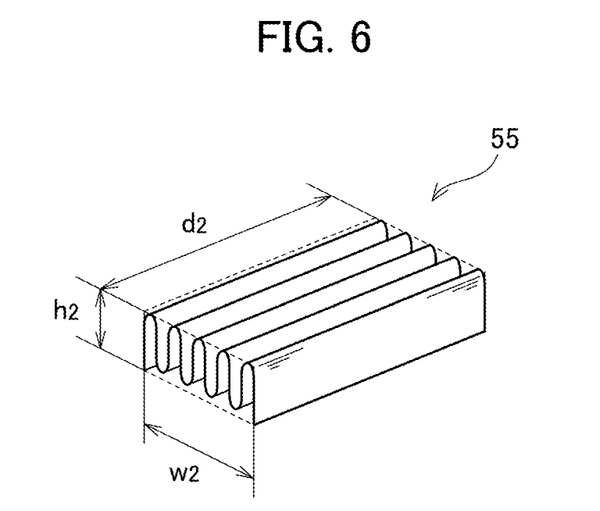
FIG. 6 is a perspective view showing an example of a heat transfer enhancer according to an embodiment.

FIG. 6 is a perspective view showing an example of the heat transfer enhancer 55 according to the present embodiment. The heat transfer enhancer 55 is installed in the second flow passage 21 to promote heat transfer between the heat medium and the second heat conductor 20. As shown in FIG. 6, the heat transfer enhancer 55 has an outer shape of the same size as that of the catalyst body 50 to be installed in the second flow passage 21. That is, the heat transfer enhancer 55 has a box-shaped outer shape having a height h2, a width w2, and a depth d2. The heat transfer enhancer 55 has a shape for increasing the contact area between the heat medium and the second heat conductor 20. Therefore, as shown in FIG. 6, for example, the heat transfer enhancer 55 is constituted of a corrugated plate forming a box-shaped outer shape. Similar to the base material 51 of the catalyst body 50, the heat transfer enhancer 55 is not limited to a corrugated plate, but may be a structure such as a porous body having a large number of through-passages formed along the heat medium flow passage. The heat transfer enhancer 55 is formed of a thermally conductive material such as aluminum, copper, stainless steel, iron plated steel, etc.

Next, the jig 60 will be described.

Figure 7A:
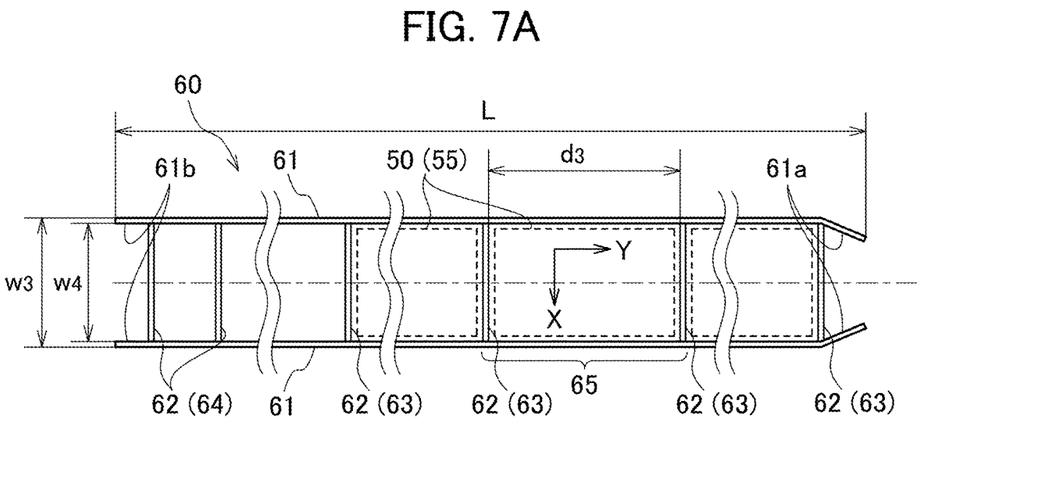
FIG. 7A is a plan view of a jig according to an embodiment.
Figure 7B:
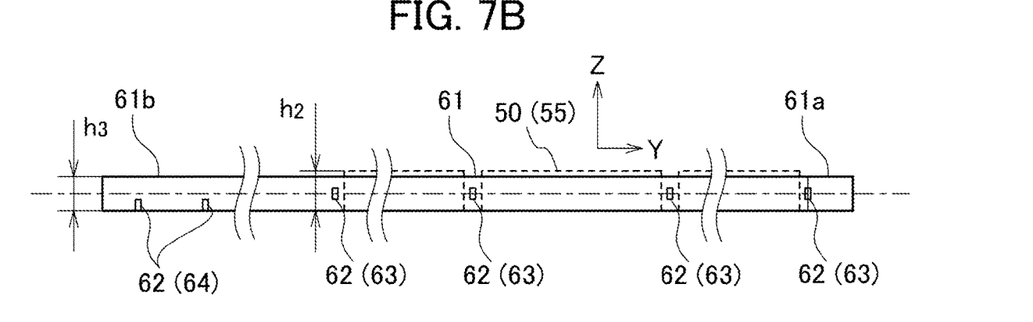
FIG. 7B is a side view of the jig shown in FIG. 7A.
Figure 8:
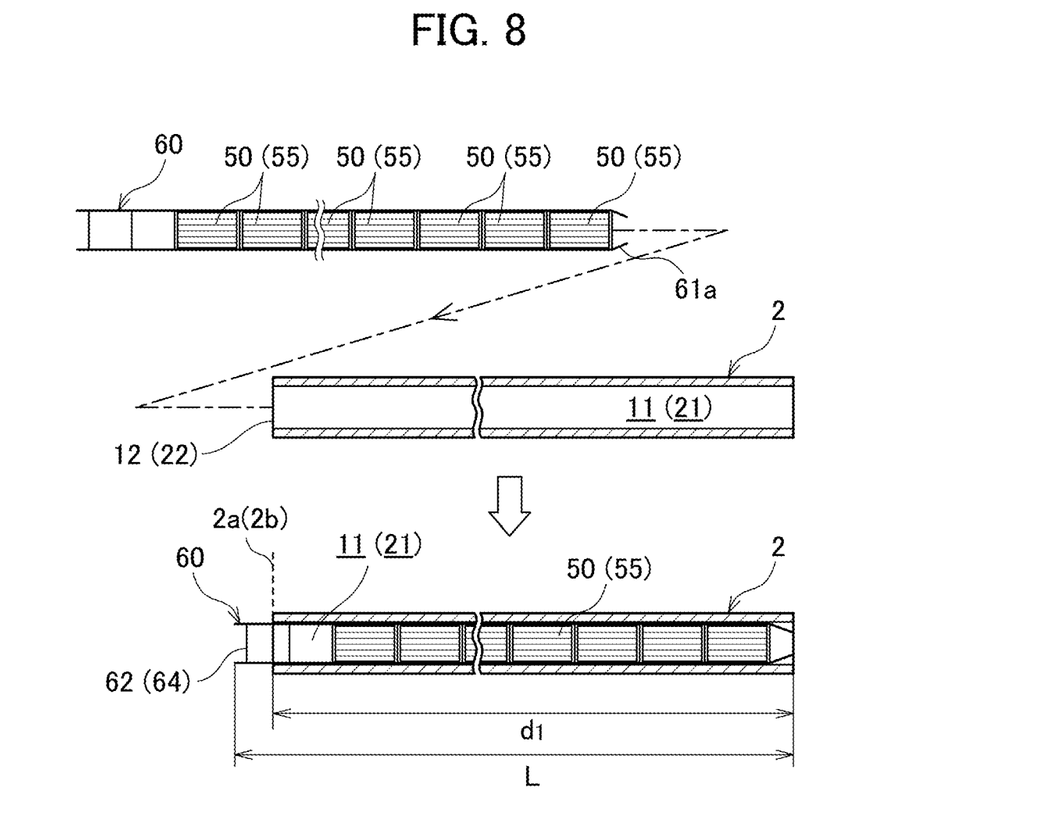
FIG. 8 is a view showing the insertion of the jig into a flow passage and the subsequent state.

FIG. 7A is a plan view of the jig 60 according to the present embodiment, and FIG. 7B is a side view of the jig 60 shown in FIG. 7A. FIG. 8 is a view showing the insertion of the jig 60 into the flow passage and the subsequent state. The jig 60 is a tool for inserting the packing into the flow passage of the reactor 1 or for removing the packing from the flow passage. Flow passage refers to the first flow passage 11 or the second flow passage 21 as described above. Also, packing refers to the catalyst body 50 or the heat transfer enhancer 55 as described above.

Hereinafter, a description will be given of an example in which the jig 60 is designed for insertion and removal of the catalyst body 50. That is, the jig 60 in this example sandwiches (holds) the catalyst bodies 50 (see FIG. 8). However, in the case where a packing to be sandwiched is the heat transfer enhancer 55, explanations relating to the catalyst body 50 may be replaced with and deemed as explanations relating to the heat transfer enhancer 55 in the following description. For example, the catalyst body 50 may be replaced with the heat transfer enhancer 55, and the first flow passage 11 may be replaced with the second flow passage 21, in the following description.

As shown in FIG. 7A, the jig 60 includes a pair of strip portions 61, 61 extending in parallel with each other, and link portions 62 arranged in the extending direction of the pair of strip portions 61, 61 and connecting the pair of strip portions 61, 61. The strip portions 61, 61 are flat plate-shaped members that are long, narrow, and thin. The strip portions 61, 61 are formed of a material excellent in toughness, heat resistance and corrosion resistance. Such a material is, for example, a superalloy such as a nickel-based alloy or the like.

As shown in FIGS. 2 and 4, the first flow passage 11 is an elongated prismatic space having a length d1, a width w1, and a height h1. As shown in FIG. 8, the jig 60 is installed in the first flow passage 11 together with the catalyst bodies 50. Accordingly, the jig 60 has an outer width w3 smaller than the width w1 and a height h3 lower than the height h1. However, the jig 60 has a length L longer than the length d1. The length L is set to 1 m, for example. The excess length of the length L with respect to the length d1 is arbitrary. For example, it is set within a range of several millimeters to several tens of millimeters in consideration of workability at the insertion time and the removal time.

The strip portions 61, 61 are extended in one direction. This direction corresponds to the extending direction of the first flow passage 11. The strip portions 61, 61 have lengths greater than the first flow passages 11 (length d1) (see FIG. 8). The strip portions 61, 61 have widths defining the height h3 of the jig 60. That is, the widths of the strip portions 61, 61 are equal to the height h3 of the jig 60. The strip portions 61, 61 have thicknesses set to be less than half of the difference between the width w1 of the first flow passage 11 and the width w2 of the catalyst body 50.

The link portion 62 is a rod-like member extending in a direction intersecting the extending direction of the pair of strip portions 61, 61. In order to prevent the link portion 62 from interfering with the flow of the reaction fluid, its dimension on the cross section of the jig 60 is set to a value sufficiently smaller than the height h3. The link portion 62 has a length with which the pair of strip portions 61, 61 sandwiches the catalyst body 50 between them. This length is equal to the inner width w4 (i.e., the distance between opposing surfaces of the pair of strip portions 61, 61) of the jig 60. Since each link portion 62 has the same length, the jig 60 has the appearance of a ladder. The link portion 62 is formed of the same material as the strip portions 61, 61.

The pair of strip portions 61, 61 hold the catalyst body 50 between them. Each link portion 62 is dotted in the extending direction of the jig 60, and maintains the inner width w4 of the jig 60 within the allowable deflection range of the strip portions 61, 61. Accordingly, as shown in FIG. 8, the jig 60 can sandwich (hold) the catalyst bodies 50 arranged in the extending direction at once.

While the catalyst bodies 50 are sandwiched at once, the jig 60 is inserted to a desired position in the first flow passage 11. In other words, it becomes easy to insert the catalyst bodies 50 into the first flow passage 11. Further, by this insertion, a part of the jig 60 is positioned in the first flow passage 11, and the catalyst bodies 50 are arranged at appropriate positions in the first flow passage. That is, it is possible to collectively install the catalyst bodies 50 at their appropriate positions with respect to one first flow passage 11. Further, it is possible to remove the catalyst bodies 50 from the first flow passage 11 at once by simply pulling out the jig 60 from the first flow passage 11.

As shown in FIG. 7A, each strip portion 61 includes a tip end portion 61a provided as one end in the extending direction and a base end portion 61b provided as the other end in the extending direction. The tip end portions 61a may be inclined to approach the mating strip portions 61, 61. That is, the tip end of the jig 60 may have a tapered shape with the inclination of the tip end portions 61a. As shown in FIG. 8, the jig 60 is inserted into the first flow passage 11 with the tip end portion 61a facing the first inlet port 12 of the first flow passage 11. The inclination of the tip end portions 61a suppresses excessive friction and unnecessary collision (abutting) between the jig 60 and the first flow passage 11, and assists insertion of the jig 60.

As shown in FIG. 7A, the link portions 62 include first link portions 63 and at least one second link portion 64. The first link portions 63 are positioned on a side with the tip end portion 61a (tip end side of the jig 60) of the strip portions 61, 61. The second link portion 64 is positioned closer to the base end portions 61b of the strip portions 61, 61 (the base end portion side of the jig 60) than the first link portions 63.

The first link portions 63 may be provided with an interval d3 in the extending direction of the pair of strip portions 61, 61. The interval d3 is slightly longer than the depth d2 of the catalyst body 50. In this case, the pair of strip portions 61, 61 and the first link portions 63 form a frame 65 opening in a direction orthogonal to a plane on which the pair of strip portions 61, 61 extend. That is, when the arrangement direction of the first flow passages 11 (the second flow passage 21) is defined as the X direction, the extension direction (longitudinal direction) of the first flow passages 11 (the second flow passage 21) is defined as the Y direction, and the stacking direction of the first heat conductor 10 and the second heat conductor 20 is defined as the Z direction (see FIGS. 4 and 7), the frame 65 is located in the XY plane and opens in the Z direction.

The opening area of the frame 65 is larger than the cross-sectional area of the catalyst body 50 facing the frame 65. In other words, the catalyst body 50 is positioned within the frame and sandwiched by the pair of strip portions 61, 61. Accordingly, when the catalyst bodies 50 are inserted, the catalyst bodies 50 move in the first flow passage 11 while being pushed by the first link portions 63. On the other hand, the catalyst bodies 50 cannot deviate from the frames 65 in the X and Y directions. Therefore, it is possible to easily and accurately position the catalyst bodies 50 at once. When the catalyst bodies 50 are removed, they abut on the first link portions 63. Thus, all catalyst bodies 50 can be reliably and collectively removed.

As described above, the opening area of the frame 65 is larger than the cross-sectional area of the catalyst body 50 facing the frame 65. That is, the jig 60 according to the present embodiment does not have a structure, which interferes with the flow of heat between the heat medium and the catalyst body 50, between the second partition wall 23 (see FIG. 3) and the catalyst body 50. Therefore, it is possible to suppress the increase of the thermal resistance between the heat medium and the catalyst body 50 due to such structure holding the catalyst body 50.

The first link portion 63 may be connected to the center in the width direction of each strip portion 61, 61. Thereby, the first link portion 63 surely abuts on the catalyst body 50. Therefore, the positional deviation caused by the reaction fluid can be kept in the frame 65 and the deviation from the first flow passage 11 can be prevented. Further, the catalyst body 50 can be reliably moved during insertion and removal.

The second link portion 64 may be connected to a position shifted from the center in the width direction of each strip portion 61, 61. For example, as shown in FIG. 7B, the second link portion 64 may be connected to an end portion (edge portion) in the width direction of each strip portion 61, 61. Thus, the shape of the pair of strip portions 61, 61 can be maintained, and interference of the flow of the reaction fluid by the second link portion 64 can be reduced.

At least one of the second link portions 64 may be located at a portion exposed from the first flow passage 11 in the pair of strip portions 61, 61. That is, as shown in FIG. 8, while the jig 60 is inserted together with the catalyst body 50 to a desired position in the first flow passage 11, at least one of the second link portions 64 may be exposed to the outside from the first flow passage 11 (heat exchange section 2). The second link portion 64 exposed to the outside forms a handle portion gripped by a tool (not shown) or a hook portion to be hooked together with the pair of strip portions 61, 61. By gripping or hooking this portion with a tool or the like and pulling out the jig 60 from the first flow passage 11, the catalyst body 50 can be efficiently removed. Especially, this effect becomes remarkable when the number of the first flow passages 11 increases.

Figure 9A:
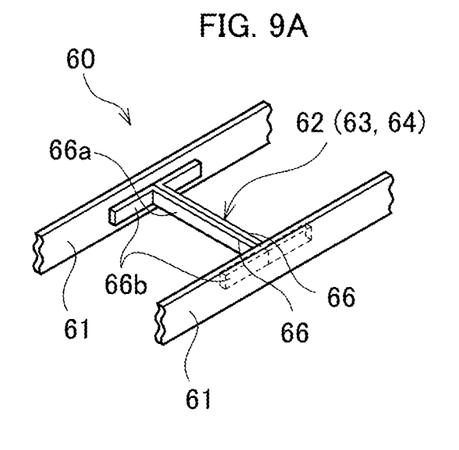
FIGS. 9A to 9F are views illustrating exemplary embodiments of a link portion.

FIGS. 9A to 9F are views illustrating exemplary embodiments of link portion 62 (first link portion 63 and second link portion 64). As shown in FIG. 9A, the link portion 62 may be composed of two band-shaped members (bar-shaped members) 66, 66. In this case, each band-shaped member 66 has a main part 66a extending between the pair of strip portions 61, 61, and a base portion 66b provided at both ends of the main part 66a and extending at right angles and in one direction to the main part 66a.

Figure 9B:
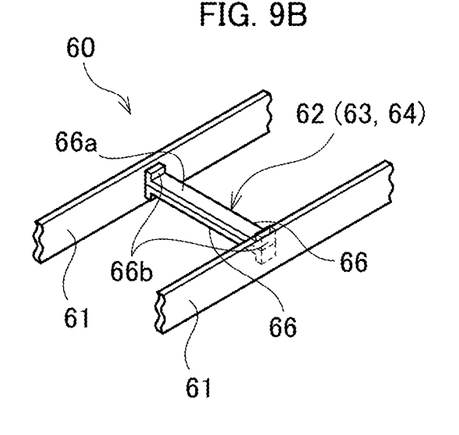

One band-shaped member 66 is arranged with the tips of the base portions 66b, 66b directed to one side in the extending direction of the first flow passage 11, and the other band-shaped member 66 is arranged with the tips of the base portions 66b, 66b directed to the other side in the extending direction of the first flow passage 11. The main parts 66a, 66a are in close contact with each other. The base portion 66b of each band-shaped member 66 is fixed to corresponding strip portions 61, 61 by welding or the like. As shown in FIG. 9B, the band-shaped members 66, 66 may be fixed in a state where the base portion 66b is disposed perpendicular to the extending direction of the first flow passage 11.

Figure 9C:
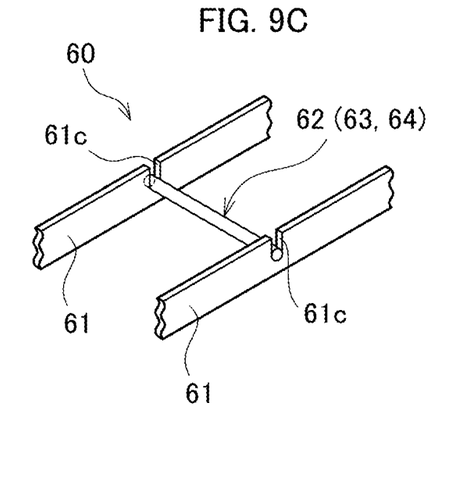
Figure 9D:
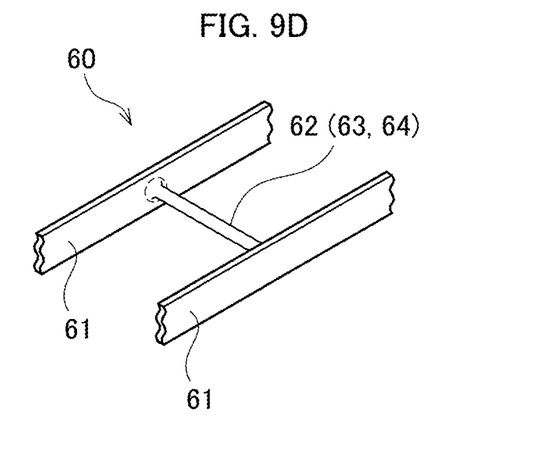

As shown in FIG. 9C, the link portion 62 may be formed of a rod-like member such as a round bar. In this case, each end of the rod-like member is fitted into a groove portion 61c formed in each strip portion 61, 61 by press-fitting or the like. As shown in FIG. 9D, each end portion of the rod-like member may be fixed to each strip portion 61, 61 by welding.

Figure 9E:
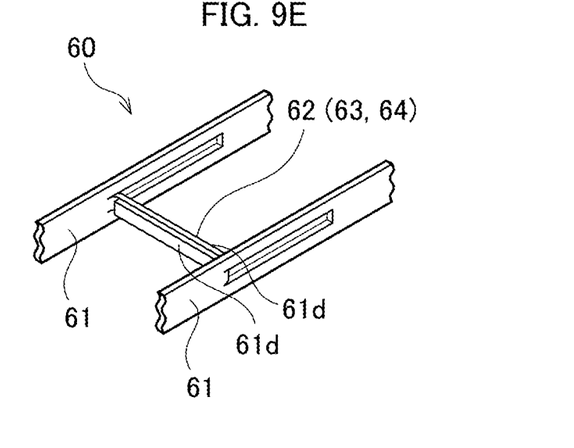
Figure 9F:
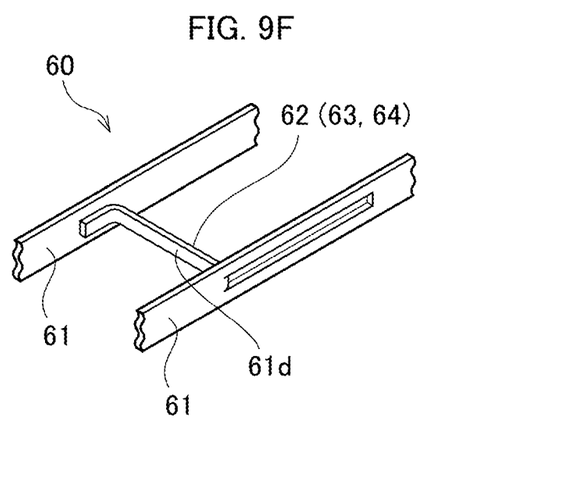

As shown in FIG. 9E, the link portion 62 may be constituted by two branch portions 61d, 61d respectively branched from the pair of the strip portions 61, 61. In this case, the two branch portions 61d, 61d are welded and integrated to be overlapped on each other. As shown in FIG. 9F, the branch portion 61d may be provided on only one of the pair of strip portions 61, 61. In this case, the tip of the branch portion 61d branched from one strip portion is fixed to the other strip portion having no branch portion 61d by welding or the like.

It should be noted that the present disclosure is not limited to the embodiments described above, but is indicated by the claims, and further includes all modifications within and meaning equivalent to the scope of claims.

What is claimed is:

1. A jig for inserting a packing into a flow passage of a reactor extending in one direction or for removing the packing from the flow passage, comprising:
   a pair of strip portions extending in parallel with each other, having a length longer than the flow passage; and
   link portions arranged in an extending direction of the pair of strip portions, linking the pair of strip portions and having lengths with which the pair of strip portions sandwich the packing between the pair of strip portions.

2. The jig according to claim 1, wherein
each of the strip portions includes:
   a tip end portion provided as one end in the extending direction; and
   a base end portion provided as the other end in the extending direction, and
the tip end portion of one of the pair of strip portions is inclined to approach the strip portion of the other of the pair of strip portions.

3. The jig according to claim 2, wherein
the link portions include:
   first link portions positioned on a side with the tip end portion and provided at intervals longer than the packing in the extending direction of the pair of strip portions; and
   at least one second link portion positioned closer to the base end portion than the first link portions.

4. The jig according to claim 3, wherein
each of the first link portions is connected to a center of each strip portion in a width direction thereof.

5. The jig according to claim 4, wherein
at least one of the at least one second link portion is located at a part of the pair of strip portions, the part being exposed from the flow passage.

6. The jig according to claim 3, wherein
each second link portion is connected to a position shifted from a center of each strip portion in a width direction thereof.

7. The jig according to claim 6, wherein
at least one of the at least one second link portion is located at a part of the pair of strip portions, the part being exposed from the flow passage.

8. The jig according to claim 3, wherein
at least one of the at least one second link portion is located at a part of the pair of strip portions, the part being exposed from the flow passage.
9. The jig according to claim 1, wherein
the link portions include:
   first link portions positioned on a side with a tip end portion and provided at intervals longer than the packing in the extending direction of the pair of strip portions; and
   at least one second link portion positioned closer to a base end portion than the first link portions.
10. The jig according to claim 9, wherein
each of the first link portions is connected to a center of each strip portion in a width direction thereof.
11. The jig according to claim 10, wherein
at least one of the at least one second link portion is located at a part of the pair of strip portions, the part being exposed from the flow passage.
12. The jig according to claim 9, wherein
each second link portion is connected to a position shifted from a center of each strip portion in a width direction thereof.
13. The jig according to claim 12, wherein
at least one of the at least one second link portion is located at a part of the pair of strip portions, the part being exposed from the flow passage.
14. The jig according to claim 9, wherein
at least one of the at least one second link portion is located at a part of the pair of strip portions, the part being exposed from the flow passage.
15. The jig according to claim 1, wherein
the flow passage is a reaction flow passage through which a reaction fluid flows, and
the packing is a catalyst body.

* * * * *